United States Patent [19]

Council, Jr.

[11] 4,455,901
[45] Jun. 26, 1984

[54] APPARATUS FOR CONTROLLING LATHED CONTACT LENS THICKNESS

[75] Inventor: Buford W. Council, Jr., Ruskin, Fla.

[73] Assignee: Bausch & Lomb Incorporated, Rochester, N.Y.

[21] Appl. No.: 310,341

[22] Filed: Oct. 9, 1981

[51] Int. Cl.³ .................. B23B 3/28; B23Q 15/00; H01H 15/00
[52] U.S. Cl. .................................... 82/12; 200/16 B
[58] Field of Search ................ 82/2 B, 12; 200/16 B

[56] References Cited

U.S. PATENT DOCUMENTS

| | | | |
|---|---|---|---|
| 3,704,641 | 12/1972 | Rhoades | 82/12 |
| 3,746,955 | 7/1973 | Kobayashi | 82/2 B |
| 3,834,256 | 9/1974 | Abbatiello | 82/2 B |
| 4,083,272 | 4/1978 | Miller | 82/12 |
| 4,202,226 | 5/1980 | Becker et al. | 82/12 |
| 4,225,758 | 9/1980 | Kondo et al. | 200/16 B |
| 4,264,249 | 4/1981 | Dawson | 82/12 |
| 4,313,355 | 2/1982 | Becker et al. | 82/12 |

Primary Examiner—E. R. Kazenske
Assistant Examiner—Paul M. Heyrana, Sr.
Attorney, Agent, or Firm—Bernard D. Bogdon; John S. Norton

[57] ABSTRACT

A device for controlling the thickness of a contact lens produced on an automatic and computerized numerically controlled (CNC) lathe is disclosed. A sensor control device is incorporated on a lens lathing machine for engaging the front surface of a lens button upon which the convex surface of the contact lens is to be machine lathed. Immediately upon contact between the sensor and the front surface, the sensor provides for breaking an electrical circuit in the lathe controller providing for automatic position registration of the lens button front surface relative to the cutting tool and its pivot point, and a lens of desired center thickness and power curve radius is subsequently generated. Close tolerances and high repeatability are domonstrated in contact lenses lathed generated by these principles.

5 Claims, 4 Drawing Figures

APPARATUS FOR CONTROLLING LATHED CONTACT LENS THICKNESS

BACKGROUND OF THE INVENTION

1. Field of the Invention

This invention relates to apparatus and techniques for improving the automatic generation of lathed contact lenses and more particularly for controlling the center thickness of lathed lenses.

2. Brief Description of the Prior Art

Heretofore, the techniques of lathing surfaces, and particularly convex surfaces, of contact lenses were substantially manually performed. In each instance it was necessary that a highly skilled technician perform the operation. Much of the operation was subject to and dependent upon the manual dexterity, coordination, vision perceptiveness and artistic abilities of a contact lens machine lathe operator.

The prior principal manual techniques employed are hereinafter described. One was generally referred to as the "disappearing dot" technique. After a contact lens button had its base or concave surface generated, it was blocked in preparation for the machining of the convex surface. The relatively flat, but rough, convex surface was marked with a crayon type marker. It was then necessary for the operator to present the cutting edge of the pivotal cutting tool to the button such that the cutting tool intersects and begins generating a finished convex curve surface starting first at the outside periphery of the cylindrical button. Since this generation takes place about a cutting tool pivot point in an arcuate path, it will be appreciated that as the cutting tool is traversed inward toward the pivot point and caused to penetrate the body of the button farther and farther, the crayoned front surface becomes smaller and smaller until a circular crayoned dot exists on the convex surface concentric with the base curve. At the instant that the dot is machined away, thus the name "disappearing dot" technique, the operator reads the machine gauges to determine the measurement of the rough center thickness of the contact lens from the apex of the base curve to the apex of the convex surface. This registers the apex of the convex surface relative to the cutting tool pivot point. From that measurement the operator is then able to determine, based upon the desired final center thickness, how much more penetration of the cutting tool is necessary in order to generate the desired final convex surface and center thickness.

As can be appreciated, it is necessary for the operator, usually under magnification, to identify precisely when the crayon mark of the center dot is finally lathed away or disappears so that registration of the cutter relative to the base curve can be made. This is a very tedious process. Typically, in this type of machining, final lens tolerances can stack up as much as ±0.04 millimeters. Further, the operation is time consuming, taking as much as 2 minutes to perform the cutting of the front surface.

Another manual technique employed is a variation of the "disappearing dot" technique. In this procedure the tool is parked on the workpiece spindle centerline and the spindle holding the workpiece is manually fed toward the tool tip until a first touch or cut of lathe material is observed. Essentially, the operator must use his vision, aided by a magnifier, to determine the position of that "first cut" of the tool tip. In essence, this procedure is similar to the "disappearing dot" technique, however, a minute step beyond the disappearance of the dot is employed. After that minute step and the first noticeable lathe cut of the button, registration of the button relative to the pivot point of the tool is accomplished and a predetermined radius can then be applied for generation of the convex surface of the contact lens. This procedure is time consuming, taking the skilled operator approximately 20 or more seconds to accomplish and provides a repeatability of tolerance stack-up, for this step alone, in the vicinity of 35 0.02 millimeters.

Another technique very similar to the previously described "first cut" technique involves parking a mounted dial indicator probe on the spindle centerline and manually bringing the rough lens face into a position of initial or first contact with the probe of the dial indicator. Reading of the dial allows the operator to provide for registration of the contact lens button with respect to the cutting tool. This technique is no more accurate or repeatable than the previous technique where the cutting tool is parked on the spindle centerline.

Another principal manual technique is referred to as "geometric blocking". A solid cylindrically shaped contact lens material button is secured, for example by adhesive, at one circular flat end to a finished blocking platform, shaped like a plug. The blocking platform or block has a uniformly cylindrical outside surface with two substantially parallel end surfaces, to one of which surfaces the flat end surface of the button is secured. The securing process registers the exposed or other end surface of the lens button to the exposed or opposite end surface of the block. After the button is secured to a selected or first surface of the block, the block at its exposed end is chucked within a lathe collett and a base or concave curve is generated into the exposed end portion of the button.

The combination of the block and the button with the generated surface, is removed from the collett and inserted into a blocking machine for blocking of the concave surface to a mating head of a second block for registration of the button with a surface of the second block. This blocking is carried out such that the mating surface of the second block is concentrically mounted to the generated concave surface. This accomplished, the button is captured between the two respective blocks. Subsequently, the cylindrical first block is removed from that face of the button to which it is adhesively attached and which is yet to undergo surface generation. In this manner the reference surface is transferred from the first block to the base of the second block.

The last surfacing operation involves machining a convex surface. After the first block has been removed, the second block is chucked within a lathe collett and machining of the convex surface is carried out relative to the base of the second block. Therefore, the ultimate center thickness of the contact lens is controlled in this last machining step.

This operation has slightly less stack-up tolerances than does the "disappearing dot" technique. Following the "geometric blocking" technique, the stack-up tolerances are approximately ±0.03 millimeters. This procedure takes slightly less than does the "disappearing dot" process.

SUMMARY OF THE INVENTION

The sensor or transducer device employed to register the position of the front surface of a contact lens button to be lathed is unique in construction and application to the field relating to contact lens lathing. The sensor provides for a zero pre-travel electrical switch such that in the first micron of movement of the sensor front surface, an electrical circuit is broken. The lathe controller thereby digitally identifies a physical position for the lens button, for generation of a predetermined convex surface by a lens lathe. The physical position is a function of the distance between the front surface of the sensor, which contacts the lens button surface to undergo machining, and the pivot operational point of the cutting tool provided for generating the convex surface, the initial and final lens thickness and the radius of the generated curve. The switch is especially designed such that if travel goes substantially beyond the point of first touch contact between the sensor and the button, neither the contact lens button nor the sensor are damaged. This system provides for accuracy and repeatability of ±0.02 millimeters in thickness control of lathed contact lenses.

The stack-up tolerances employing the principles of the present invention for the final or convex surface generation approximate ±0.01 millimeters or better. As a result, this procedure accounts for 50% or more accuracy over the prior art manual methods. Further, the time of operation for the procedure according to the principles of the present invention can be consistently held at approximately 7 seconds and this cuts the time of the principal prior art methods by anywhere from ⅛ to ¼.

DETAILED DESCRIPTION OF THE PREFERRED EMBODIMENT

Figure 1:
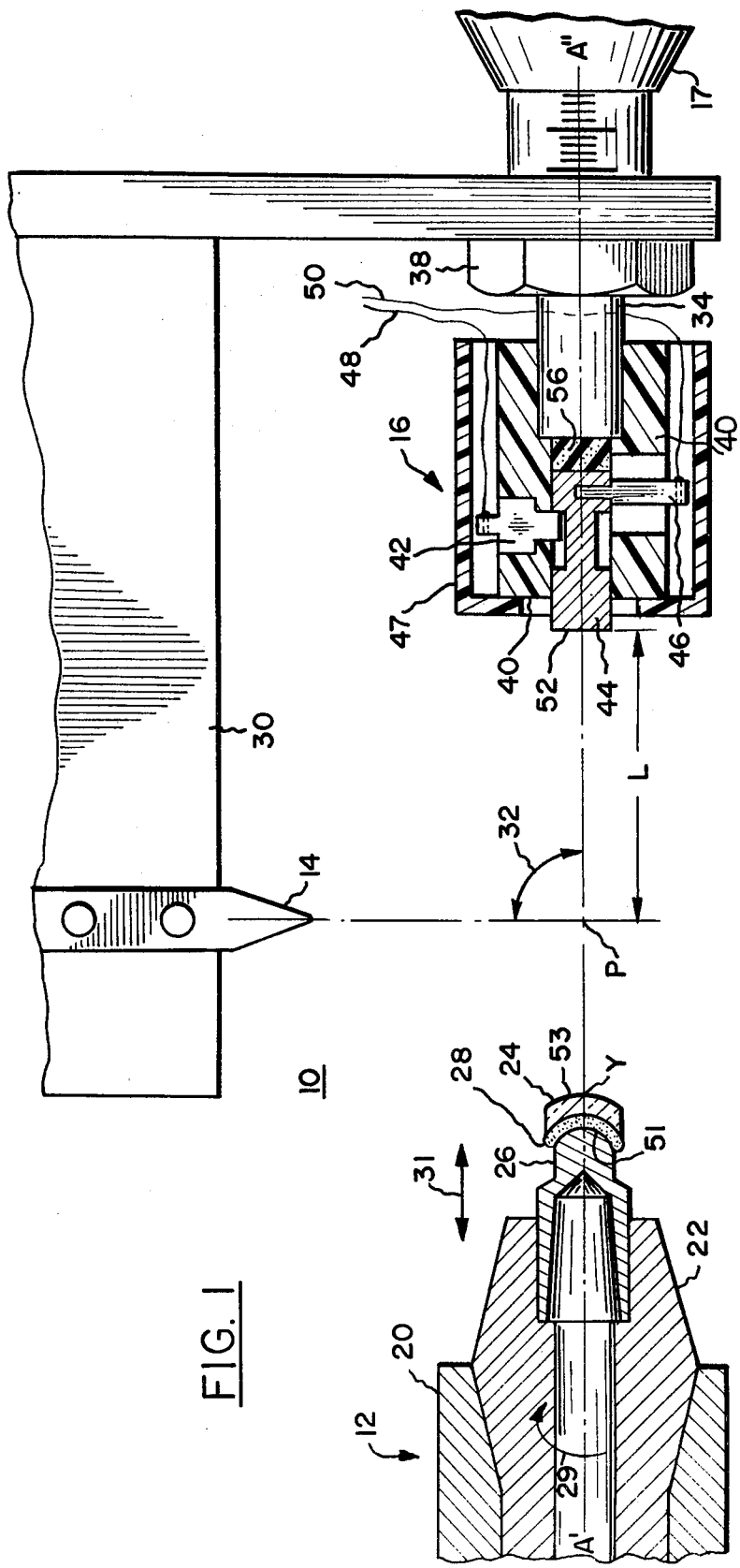
FIG. 1 is a plan and partial and cross-sectional view of a system according to the principles of the present invention, including a contact lens lathing machine equipped with a cutting tool and a transducer for providing cutting registration of a contact lens button in preparation for lathing a convex surface on the lens button.
Figure 2:
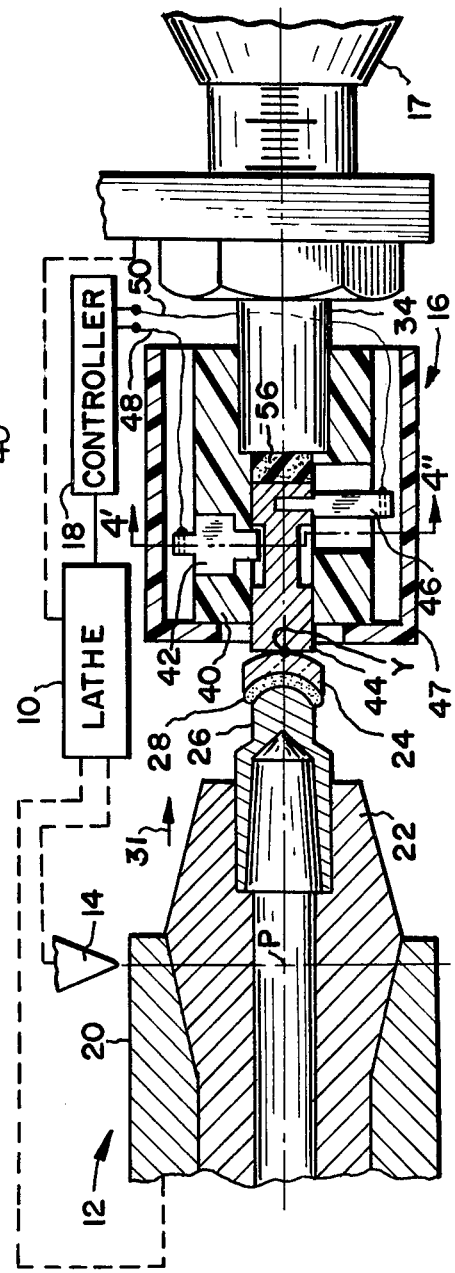
FIG. 2 is a plan and partial and cross-sectional view of the system of FIG. 1, wherein the contact lens button front surface is registered with respect to the cutting tool through a controller, schematically illustrated.

FIGS. 1 and 2 best illustrate a contact lens lathing machine 10 including a rotatable and movable spindle assembly 12, a cutting tool 14 and a sensor assembly 16. The lathe machine 10 and its illustrated parts except for the sensor assembly 16 and the micrometer 17 is manufactured by Robertson Engineering Limited a part of City Crown Ltd. of England. In the preferred embodiment a Robertson Model Mark IV is selected. The lathe machine 10 is modified to incorporate the sensor assembly 16 for use with a controller 18 manufactured by Summit-Dana Corporation of Bozeman, Montana and known as "Bandit" controller.

The spindle assembly 12 comprises a spindle shaft 20 for engaging a collett 22 for holding a workpiece, in this case, a contact lens button 24 secured and concentrically mounted to a carrier block 26 by blocking compound 28. The spindle assembly is operative to rotate as indicated by arrow 29 and to traverse back and forth in a linear direction as indicated by double headed arrow 31, as best seen in FIG. 1. The blocking compound can be of any suitable material and can be, for example, dental impression compound combined with beeswax.

The material of the contact lens button workpiece 24 can be of any suitable lathing material. These materials can comprise, for example, polysiloxane, polymethylmethacrylate (PMMA), cellulose acetate butyrate (CAB) and poly(hydroxalkyl methacrylate), including HEMA with other constituents such as vinylpyrrolidone and modifiers such as cross-linkers and catalysts. The cutting tool 14 is a diamond pointed cutting blade securely fastened to a base 30 included as a part of the lathe machine 10. The lathe 10 operates to pivot the cutting tool 14 in the quadrant identified by double headed arcuate arrow 32 about a pivot point P when operating to generate a convex front surface on the lens button 24.

The sensor assembly 16 is securely fastened to a non-rotating linearly moving plunger 34 which is included as a part of a micrometer assembly 17 secured to the base frame 30 of the lathe machine 10 by a fastener 38. The sensor assembly 16 basically comprises a stationary subassembly including a cylindrical base 40 supporting a stationary electrical contact 42 and a mobile or movable subassembly including a workpiece contact plunger 44 carrying a movable electrical contact 46. When the movable and the stationary assemblies of the sensor assembly 16 are positioned in the positions as illustrated in FIG. 1, an electrical circuit is complete to the controller 18 through electrical lead 48 to stationary contact 42 through contact plunger 44 and movable contact 46 secured to plunger 44 and electrical lead 50. FIG. 2 illustrates the contact position between the button 24 and the plunger 44, and is more fully explained hereinafter. Contacts 42 and 46 and plunger 44 are made of any suitable electrically conductive material. The sensor assembly 16 is enclosed within a sleeve housing 47. The housing 47 and the stationary base 40 are comprised of suitable insulative material.

Figure 4:
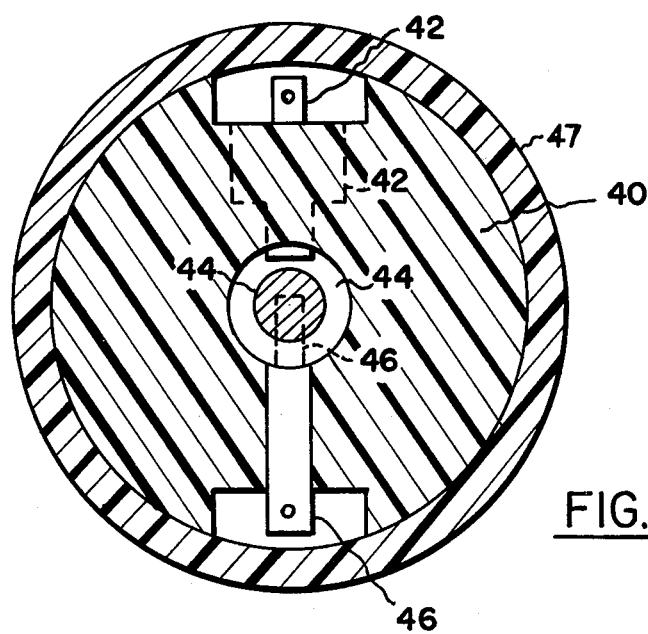
FIG. 4 is a cross-sectional end view of the sensor device of FIG. 2 along line 4'—4" of FIG. 2.

FIG. 4 is a cross-sectional view of the sensor assembly 16 along lines 4'—4" of FIG. 2. This illustration shows the circular or cylindrical construction of the preferred embodiment of the sensor assembly 16.

In operation a contact lens button 24 is cemented to a carrier block 26 after the contact lens button has had its base or concave surface 51 generated. A front surface of the button 24 is provided with a rough cut arcuate face 53. The blocked contact lens button 24 is captured within the spindle assembly 12. The spindle assembly 12 is then rapidly traversed toward the sensor assembly 16 in the direction of arrow 31 as best seen in FIG. 2. When the button 24 is approximately a half millimeter from the face 52 of the plunger 44, the traverse of the spindle assembly 12 is slowed. When contact is made between the apex point Y of the arcuate face 53 of the contact lens button 24 and the face 52 of the plunger 44, the plunger 44 is caused to traverse inwardly toward the plunger 34 of the micrometer 17. Resistance to this movement, for protection to the sensor assembly 16 and the contact lens button 24, is provided by a sponge damping pad 56, which is located between the sensor plunger 44 and the micrometer plunger 34. The pad 56 may be of any suitable, highly resilient insulative, damping material. After approximately one micron movement of the plunger 44, as illustrated in FIG. 2, the electrical circuit of the controller 18 is broken and the controller 18 registers the relationship of point Y on the surface 53 of the button 24 with respect to the tool pivot point P. Practically, the button face 53 depresses the plunger 44 a typical distance each time. Therefore, the first step in the cutting program is to back off the typical distance. Additionally, as will be appreciated, FIG. 2 exaggerates the one micron displacement of the plunger 44 for illustrative purposes only.

Figure 3:
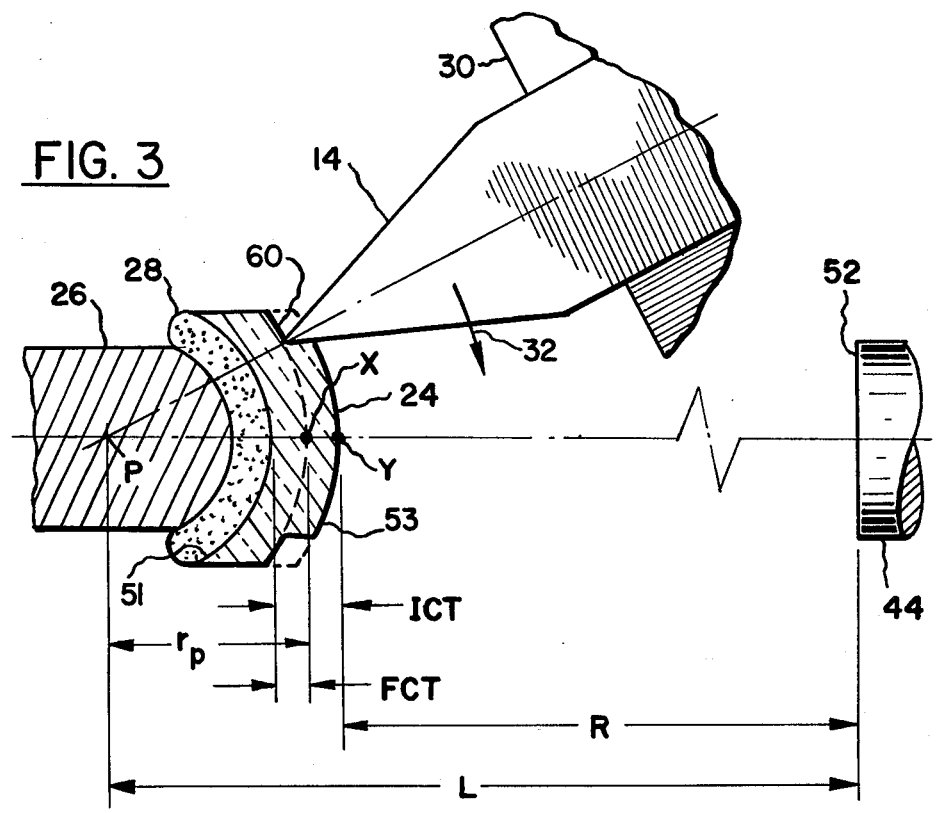
FIG. 3 is a plan and partial and cross-sectional view of a cutting tool generating the front surface on the blocked contact lens button according to the principles of the present invention.

After this registration process, the spindle assembly 12 is retracted to a distance R as shown in FIG. 3 and expressed by the following equation:

$$R = L - ICT + FCT - r_p$$

where,

R is the distance the button surface 53 is retracted from the sensor plunger surface 52 to a cut position;

L is the initial distance between the sensor plunger surface 52 and the cutter tool pivot point P;

ICT is the initial contact lens button center thickness;

FCT is the final contact lens center thickness; and $r_p$ is the radius of the convex power curve.

In FIG. 3 there is illustrated the cutting tool 14 generating the final convex surface 60 on the lens button 24. From the preceding equation it will be appreciated that the distance between the tool pivot point P and the front generated final convex surface 60 is $r_p$.

It will be appreciated that the distance R is a function of the type of lens to be cut, whether the lens button 24 is to have precuts, i.e. cuts before the final cut, and the desired center thickness relative to the lens edge thickness. In certain such cases the value of $r_p$ will vary. For a precut, the initial value of $r_p$ will be greater than a final cut $r_p$ value. A lens cut with a greater first than second value of $r_p$ will have a center of greater thickness than the edge. Whatever combinations are used, the initial registration procedure allows such after cutting techniques to be performed automatically. This can be accomplished while in the same setup.

The following more fully describes the mathematical relationships that exist to establish the cutting position of the cutting tool 14 relative to the contact lens workpiece or button 24 for generating the convex surface in the example given. It will be appreciated that the axis of the spindle 12, illustrated by axial line A'—A", is collinear with the axis of the transducer or sensor 16 concentrically mounted to the micrometer 17. When the spindle assembly 12 carrying the workpiece 24 is in the cut position, as shown in FIG. 3, the distance from the pivot point P of the cutting tool 14 to the contact surface 52 of the sensor plunger 44 is L, as illustrated in FIGS. 1 and 3. Further, in the cut position the distance from the pivot point P to any point on the finished convex surface 60 of the lens, for example the apex point X, is the power curve radius $r_p$, as illustrated in FIG. 3. It follows that the distance from the finished surface apex lens point X to the plunger face 52, along the axis A'—A", is $L - r_p$.

Further, the apex point Y, situated on the spindle axis A'—A" at the work or rough front surface 53 of the lens button 24, is at a distance R from the front surface 52 of the sensor plunger 44. The distance is measured along the axis A'—A", and is defined by the following formula:

$$R = [L - r_p] - [ICT - FCT].$$

This can be expressed, as hereinbefore stated, as follows:

$$R = L - ICT + FCT - r_p.$$

In the manufacture of contact lenses according to the principles of the present invention, a preferred ICT dimension is approximately 1.0 millimeter.

Therefore, after there is contact between the contact lens button 24, apex point Y, and the plunger surface 52, the spindle 12 retracts the distance R to the desired cut positin, whether final or pre-cut.

The micrometer 17 provides for initial alignment and registration as a function of the L distance measured from the centerline of the cutting, 14, tool as shown in FIG. 1 to the front face 52 of the sensor assembly 16. As hereinbefore stated, the preferred ICT, although arbitary, is approximately 1 millimeter. Initially, the buttons are machined to tight tolerances. The selected dimension is tightly held. Nevertheless, variations will exist and the micrometer can be adjusted to average out the final lens thickness of lathed buttons. On the other hand, the micrometer can be quickly adjusted for each button to therefore give the most careful consideration to the machining of the lens thickness on a particular button. This type of micrometer arrangement provides for easy biasing of the sensor or transducer assembly 16. A micrometer suitable for such adjustment is Model No. 153-201 of the Mitutoyo Manufacturing Company Limited of Japan.

After the machining of the contact lens button 24 to form the contact lens as illustrated in FIG. 3, other automatic cutting steps, or an edge polishing procedure, can be accomplished to provide an optically suitable lens where the edge is comforatable for fit in the human eye. The methods and apparatus of this invention are also applicable to use in the generation of toric contact lenses.

It is claimed:

1. A contact lens lathing machine for generating a vision surface on a contact lens at a machine cut position, comprising:

a rotatable spindle for carrying a contact lens workpiece having a work surface disposed for lathing;

a lathe tool for cutting the contact lens workpiece when disposed at the machine cut position at the lens work surface to generate a vision surface of predetermined curvature for a lens of predetermined thickness;

a transducer including a stationary, nonelectrically conductive first subassembly having an electrical contact and a movable, electrically conductive second subassembly having an electrical contact, the second subassembly being slidably received within the first subassembly, the contact of said first subassembly being electrically engaged to said second subassembly when said contact of said second subassembly is in a first position to provide an electrical path, the contact of said second subassembly moved to a second position and the transducer providing an electrical response by movement of the second subassembly relative to the first subassembly imparted by the physical interference between the second subassembly and the work surface of the contact lens workpiece;

measuring means mounted to the stationary first subassembly for engaging and measuring movement of the second subassembly upon contact between the worksurface of the contact lens workpiece and the second subassembly and a controller responsive to the electrical response provided by the transducer for registering the physical interference location relative to the cut position to generate control signals for disposing the lathe tool with respect to the contact lens workpiece for generating, as a function of the electrical response, a vision surface of predetermined curvature for a lens of predetermined thickness.

2. The contact lens lathing machine as defined in claim 1, wherein the control signals generated for disposing the contact lens workpiece with respect to the lathe tool are a function of the physical interference location relative to the cut position, the initial thickness of the contact lens workpiece, the radius of curvature of the vision surface to be generated on the contact lens workpiece and the desired final contact lens center thickness.

3. The contact lens lathing machine as defined in claim 1, and futher including damping means positioned between the movable second subassembly and the measuring means for providing resistance to movement of the second subassembly.

4. The contact lens lathing machine as defined in claim 3 wherein the damping means is an insulative pad of highly resilient material.

5. The contact lens lathing machine as defined in claim 1, wherein the transducer first and second subassemblies are cylindrical and are received within an insulative housing.

* * * * *

UNITED STATES PATENT AND TRADEMARK OFFICE
CERTIFICATE OF CORRECTION

PATENT NO. : 4,455,901

DATED : June 26, 1984

INVENTOR(S) : Buford W. Council, Jr.

It is certified that error appears in the above-identified patent and that said Letters Patent are hereby corrected as shown below:

Col. 2, line 10, delete "35" and substitute therefor --±--;

Col. 3, line 33, delete "1/8" and substitute therefor --1/2--;

Col. 4, line 35, after "positioned" delete "in the positions"; and

Col. 7, line 7, before "and" insert --;--.

Signed and Sealed this

Twenty-sixth Day of February 1985

[SEAL]

Attest:

DONALD J. QUIGG

Attesting Officer

Acting Commissioner of Patents and Trademarks